US008404162B2

(12) United States Patent
Okoli et al.

(10) Patent No.: US 8,404,162 B2
(45) Date of Patent: Mar. 26, 2013

(54) COMPOSITE MATERIALS AND METHODS FOR SELECTIVE PLACEMENT OF NANO-PARTICULATES WITHIN COMPOSITES

(75) Inventors: Okenwa O. I. Okoli, Tallahasee, FL (US); Myungsoo Kim, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 618 days.

(21) Appl. No.: 12/644,156

(22) Filed: Dec. 22, 2009

(65) Prior Publication Data

US 2010/0227153 A1 Sep. 9, 2010

Related U.S. Application Data

(60) Provisional application No. 61/139,755, filed on Dec. 22, 2008.

(51) Int. Cl.
*B29C 44/12* (2006.01)

(52) U.S. Cl. ....... 264/45.3; 264/112; 264/134; 264/309; 264/DIG. 9; 264/DIG. 10; 264/44; 264/610; 264/656; 264/657; 264/313; 264/316; 264/318; 264/334; 442/181; 977/778

(58) Field of Classification Search .................. 442/181; 264/112, 134, 309, DIG. 9, DIG. 10, 44, 264/45.3, 49, 610, 656, 657, 313, 316, 318, 264/334; 977/778
See application file for complete search history.

(56) References Cited

U.S. PATENT DOCUMENTS

| 5,258,089 | A | * | 11/1993 | Tanaka et al. | 156/324.4 |
|---|---|---|---|---|---|
| 5,738,817 | A | * | 4/1998 | Danforth et al. | 264/603 |
| 6,680,013 | B1 | * | 1/2004 | Stein et al. | 264/44 |
| 7,438,970 | B2 | * | 10/2008 | Magario et al. | 428/297.4 |
| 8,143,337 | B1 | * | 3/2012 | Lee et al. | 524/445 |
| 2003/0039816 | A1 | * | 2/2003 | Wang et al. | 428/299.1 |
| 2005/0266162 | A1 | * | 12/2005 | Luo et al. | 427/180 |
| 2006/0017191 | A1 | | 1/2006 | Liang et al. | |
| 2006/0252869 | A1 | * | 11/2006 | Twardowska-Baxter et al. | 524/445 |
| 2008/0057265 | A1 | | 3/2008 | Liang et al. | |
| 2008/0280115 | A1 | | 11/2008 | Liang et al. | |
| 2009/0280324 | A1 | | 11/2009 | Liang et al. | |
| 2010/0188833 | A1 | * | 7/2010 | Liang et al. | 361/818 |
| 2010/0247908 | A1 | * | 9/2010 | Velev et al. | 428/365 |
| 2011/0129546 | A1 | * | 6/2011 | Umbert Mill | 424/639 |
| 2011/0220851 | A1 | * | 9/2011 | Sue et al. | 252/507 |
| 2012/0225272 | A1 | * | 9/2012 | Costeux et al. | 428/220 |

OTHER PUBLICATIONS

Bekyarova, E. et al. "Multiscale Carbon Nanotube-Carbon Fiber Reinforcement for Advanced Epoxy Composites," Langmuir (2007). 23, 3970-3974 (published by the American Chemical Society online and in the USA).

(Continued)

*Primary Examiner* — Christina Johnson
*Assistant Examiner* — Saeed Huda
(74) *Attorney, Agent, or Firm* — Sutherland Asbill & Brennan LLP (57) ABSTRACT

Composite materials and methods for making composites are provided. The method includes providing a nano-particulate-depletable material that includes a plurality of nano-particulates on or within a depletable material; positioning the nano-particulate-depletable material on or within a structural material; and depleting the depletable material such that the nano-particulates are selectively placed on or within the structural material. Depletion may include infusion of a resin into the structural material. The depletable material may be a polymeric foam, and the nano-particulates may be carbon nanotubes.

8 Claims, 6 Drawing Sheets

Carbon Fabric

Nanotubes Within Depletable Foam

OTHER PUBLICATIONS

Han, X. et al. "Extrusion of Polystyrene Nanocomposite Foams with Supercritical CO2," Polymer Engineering and Science, 43(6):1261-75, 2003 (published by John Wiley & Sons, Inc. online and in the USA).

Kim, Myungsoo et al. "Processing, characterization, and modeling of carbon nanotube-reinforced multiscale composites," Composites Science and Technology, 69, 2009, 335-342 (published by Elsevier Ltd. online and in the USA).

Lee. L. J. et al. "Polymer Nanocornposite Foams," Composite Science and Technology, 65:2344-2363, 2005 (published by Elsevier Ltd. online and in the USA).

Nwabuzor. A. O. et al. "Preliminary Assessment of the Ultra Violet Curing of Composites Manufactured by the Resin Infusion between Double Flexible Tooling Process," Polymer Composites, 27:417-424, 2006 (published by John Wiley & Sons, Ltd. online and in the USA).

Okoli, O.I. et al, "Aspects of the Tensile Response of Random Continuous Glass/Epoxy Composites." Jn. of Reinforced Plastics and Composites, 18(7):606-613, 1999 (published by SAGE publications online and in the USA).

Shen, J. et al. "Synthesis of Polystyrene-Carbon Nanofrbers Nanocomposite Foams," Polymer 46:5216-5224, 2005 (published by Elsevier Ltd. online and in the USA).

Thagard, J.R. et al, "Resin Infusion between Double Flexible Tooling: Prototype Development," Composites: Part A, 34:803-811, 2003 (published by Elsevier Ltd. online and in the USA).

Thagard, J. R., "Resin infusion between Double Flexible Tooling: Evaluation of Process Parameters," J. of Reinforced Plastics and Composites, 23(6):1767-1778, 2004 (published by SAGE publications online and in the USA).

Thostenson, Erik T. et al. "Processing-Structure-Multi-Functional Property Relationship in Carbon Nanotube/Epoxy Composites," Carbon (2006), 44 3022-3029 (published by Elsevier Ltd. online and in the USA).

Tsai, C. et at "Elastic Property Prediction of Single-Wailed Carbon Nanotube Buckypaper/Polymer Nanocomposites: Stochastic Bulk Response Modeling," J. of Nanoscience and Nanotechnology, 11, 2011, 2132-2141 (published by American Scientific Publishers online and in the USA).

Zeng, C. et al. "Dynamic Silica Assembly for Fabrication of Nanoscale Polymer Channels," Materials Letters, 59:3095-3098, 2005 (published by Elsevier Ltd. online and in the USA).

Zeng, C. et al. "Poly(methyl methacrylate) and Polystyrene/Clay Nanocomposites Prepared by in-Situ Polymerization," Macromolecules, 34(12):4098-4103, 2001 (published by ACS Publications online and in the USA).

Zeng, C. et al "Polymer-Clay Nanocomposite Foams Prepared Using Carbon Dioxide," Advanced Materials, 15 (20):1743-47, 2003 (published by Wiley-VCH Verlag GmbH & Co, KGaA online and in the USA).

Zeng, C. et at "Synthesis and Processing of PMMA Carbon Nanotube Nanocomposite Foams," Polymer, 51, 2010, 655-664 (published by Elsevier Ltd. online and in the USA).

* cited by examiner

COMPOSITE MATERIALS AND METHODS FOR SELECTIVE PLACEMENT OF NANO-PARTICULATES WITHIN COMPOSITES

CROSS-REFERENCE TO RELATED APPLICATION

This application claims benefit of U.S. Provisional Application No. 61/139,755, filed Dec. 22, 2008, which is incorporated herein by reference.

BACKGROUND OF THE INVENTION

This invention relates generally to methods for making composite materials comprising nano-particulates and composite materials made thereby, and more particularly to methods for selectively placing nano-particulates on or within composites.

The use of advanced composites in various types of structures has been previously researched and it has been found that some composites have poor out-of-plane performance due substantially to matrix failure. Some textile composites also undesirably include matrix material-rich regions formed in gaps between interlaced fiber bundles of the textile composites. These matrix-rich regions, where cracks may initiate and propagate, are difficult to reinforce with traditional microscale fiber reinforcement.

Previously, the introduction of nano-particulates in advanced composites has been researched and heralded as a possible method for avoiding the aforementioned deficiencies. However, harnessing the benefits of these "multiscale" composites has been difficult due to inadequacies in current manufacturing methods. The majority of the reported work has been based on using sonication and shear techniques, including calendering, to disperse nano-particulates in liquid resins. The nano-particulate-doped resins then may be directly applied onto or infused into reinforcing fabrics to form composites. These techniques, however, are limited to doped resins that have about 3 weight % nanoparticles, as the doping of small amounts of nanoparticulates avoids an excessive rise in the resins' viscosities. Increased resin viscosity makes resin infusion difficult and inhibits fiber wetting. Other developments reported have involved growing nano-particulates on reinforcing fibers to form composites. Other research has demonstrated spraying nano-particulates directly on reinforcing or structural fibers prior to infusion of a resin to form composites.

It therefore would be desirable to provide improvements for introducing nano-particulates into composites. In particular, it would be desirable to provide cost-effective methods to selectively place dispersed nano-particulates wherever desired in composites while reducing or avoiding the aforementioned deficiencies. Improved nano-particulate composite materials would also be desirable.

SUMMARY OF THE INVENTION

Composite materials comprising dispersed nano-particulates and methods for making such composites have been developed. In one aspect, improved techniques are provided for making composites by selectively placing nano-particulates within the composites. In one embodiment, the method for making a composite includes (a) providing a nano-particulate-depletable material comprising a plurality of nano-particulates on or within a depletable material; (b) positioning the nano-particulate-depletable material on or within a structural material; and (c) depleting the depletable material such that the nano-particulates are selectively placed on or within the structural material. In one embodiment, the depletable material comprises a foam. The depletable material may comprise a polymer or a polymer precursor. In one embodiment, the depletable material comprises a polystyrene foam. In a particular embodiment, the method comprises dispersing the nano-particulates on or within a polystyrene foam during manufacture of the polystyrene foam. The nano-particulates may comprise carbon nanotubes. The structural material may comprise a polymer, carbon fibers, glass fibers, or a combination thereof.

DETAILED DESCRIPTION OF THE INVENTION

Improved methods have been developed for making composite materials, or composites. In one aspect, the methods include providing a plurality of nano-particulates on or within a depletable material (i.e., providing a nano-particulate-depletable material), incorporating the nano-particulates and the depletable material into a structural material, and then depleting the depletable material to form the composite. The nano-particulates may be selectively positioned on or within the structural material of the resulting composite. As used herein "depleting" or "depleted" refers to the degradation, decomposition, breakdown, removal, reduction, melting, or displacement of the depletable material by interaction with a resin (e.g., chemical reaction) or by other methods.

Thus, in certain embodiments, the methods utilize a depletable material to enable selective placement of nano-particulates in multiscale composite laminates. In a particular embodiment, the nano-particulates are carried by a depletable material before they are incorporated on or into a structural material (also referred to herein as a "reinforcing material") to form a composite. The term "carried by" refers to the nano-particulates being encapsulated, entrapped, or otherwise fixed to or within the depletable material.

Thus, these methods may provide advantages such as cost reduction, environmentally friendly attributes, and improved handling of the nano-particulates during storage, transport, and/or processing, for example, as compared to a loose or free-flowing form of the nano-particulates. The ease of placing a nano-particulate-depletable material wherever desired may be advantageous to improve the properties (e.g., strength properties, stiffness properties, toughness properties, electrical behavior, and/or addition of nano-particulate reinforcement) of composites. Additional improvements to the composites include potentially creating a network of current carriers with the selectively placed nano-particulates. Other embodiments of the methods are used to enhance woven or non-woven fabric-reinforced (e.g., carbon fabric) composites by improving the properties (e.g., the aforementioned composite properties) of the composites at selected areas of the composites. The advanced composites produced by these methods may be used in naval and automotive structures and have potential application in the aerospace sector.

METHODS FOR SELECTIVELY PLACING NANO-PARTICULATES WITHIN COMPOSITES

In one aspect, a method is provided for making a composite that includes the following: (a) providing a nano-particulate-depletable material comprising a plurality of nano-particulates on or within a depletable material; (b) positioning the nano-particulate-depletable material on or into a structural material; and (c) depleting the depletable material such that the nano-particulates are selectively placed on or within the structural material.

In some embodiments, the nano-particulate-depletable material may comprise a depletable material such as a polymer or a foam. In certain embodiments, the depletable material comprises polystyrene (i.e, any styrene compound), vinyl ester, epoxy, or polycarbonate. The nano-particulate-depletable material which comprises nano-particulates may be provided by essentially any suitable method, including for example, a spraying method or a prefabrication method, as described below.

The nanoparticulates may be present in the nano-particulate-depletable material in an amount greater than about 0% and less than about 100%. In one embodiment, the nano-particulates are present in the nano-particulate-depletable material in an amount ranging from about 10 weight % to about 90 weight % of nano-particulate-depletable material. In another embodiment, the nano-particulates are present in the nano-particulate-depletable material in an amount ranging from about 20 weight % to about 60 weight % of nano-particulate-depletable material.

Spraying Method

Figure 1A:
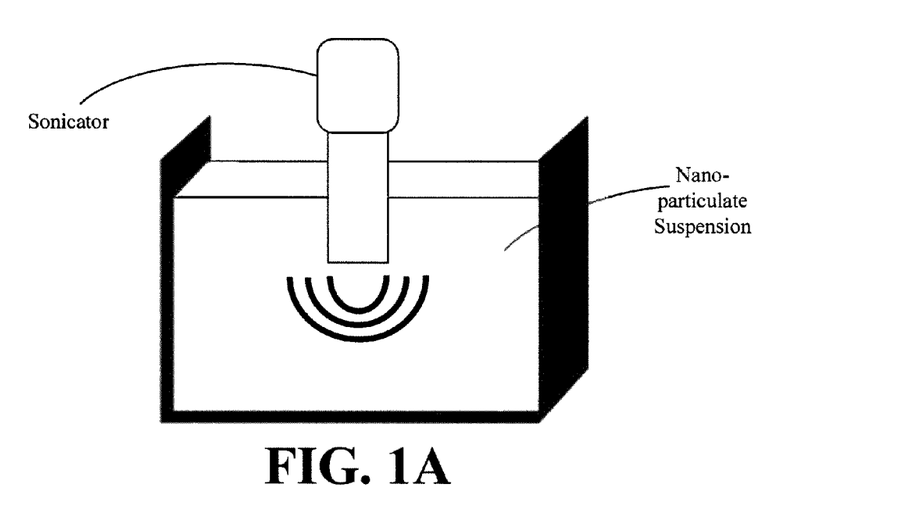
FIGS. 1A-D illustrate steps in one embodiment of a method for making a composite comprising dispersed nano-particulates.
Figure 1B:
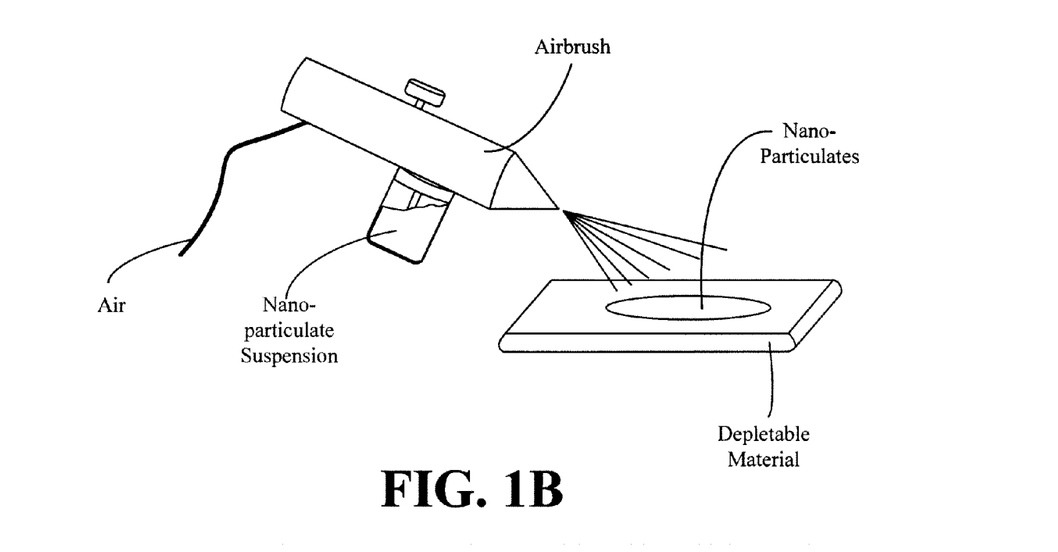

In one embodiment, the method comprises providing a nano-particulate-depletable material by spraying nano-particulates on a depletable material, such as depletable polymer foam (also referred to herein as "displaced foam"). In one embodiment, the nano-particulates are first suspended in a fluid (e.g., an aqueous or organic non-solvent). The suspension may be sonicated to produce a well dispersed suspension, as illustrated in FIG. 1A. The nano-particulate suspension is then sprayed onto a depletable material, as shown in FIG. 1B. The depletable material may be, for example, an expanded polystyrene foam. Multiple layers of nano-particulates may be sprayed on the depletable foam, to achieve a desired concentration of nano-particulates on/in the depletable material. The sprayed depletable foam is allowed to dry, resulting in depletable foam including nano-particulates.

Figure 1C:
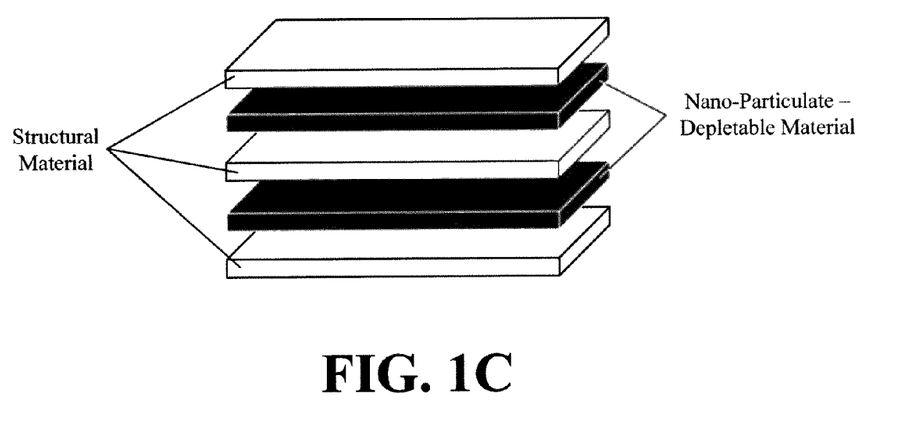

In a preferred embodiment, the nano-particulate-depletable foam made as described above is then is placed on or within one or more structural materials, such as a woven or non-woven reinforcing fabric. Multiple layers of the nano-particulate-depletable foam may be sandwiched between multiple layers of structural materials, for example, as shown in FIG. 1C.

Figure 1D:
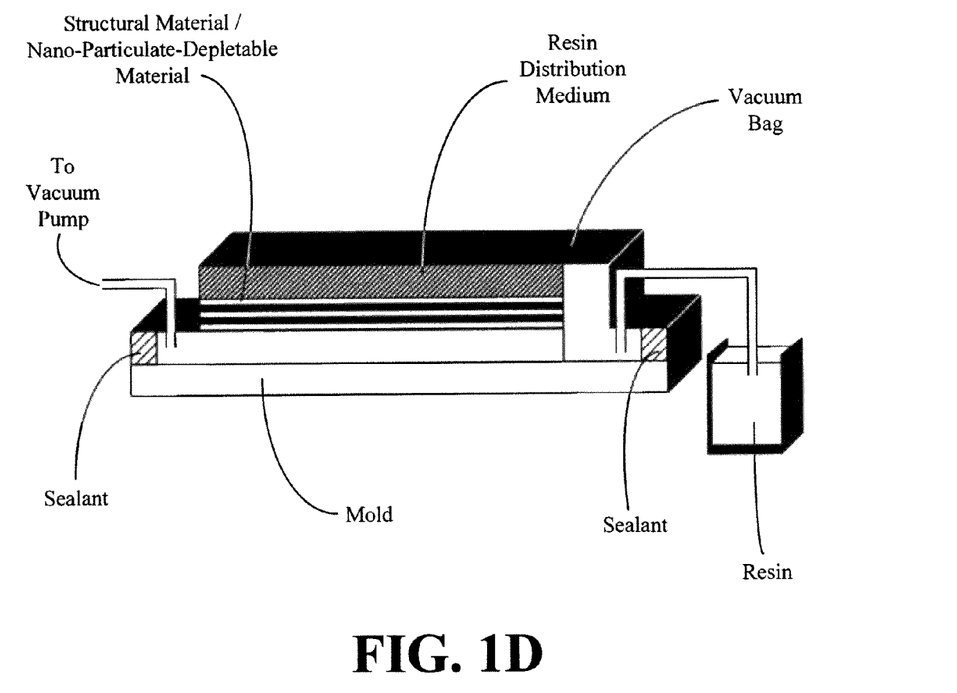

The combined structure (nano-particulate-depletable foam+structural material) is then subjected to a depletion process. Depletion of the depletable material may occur before, after, or simultaneously with the addition of another structural material into/onto the combined structure. For example, the assembly of FIG. 1C, may be placed within vacuum infusion equipment for resin impregnation, as shown in FIG. 1D. As the resin is impregnated into the nano-particulate-depletable material and the structural material, the depletable material is depleted, the nano-particulates are left on or within the structural material, and the resin is impregnated into the structural material to form a multi-scale composite. In certain embodiments, the resin is cured at room temperature. In another embodiment, temperatures above room temperature are used to cure the resin. Upon resin cure, the resulting multi-scale composite laminate may be de-molded by any procedure known in the art.

Prefabrication and Nano-Foam Methods

In another embodiment, the method includes mixing the nano-particulates into a depletable material or precursor thereof as part of the manufacture of the depletable material. Thus, prefabricated nano-particulate-depletable materials may be provided. In one example, a depleted nano-foam ("Dn-F") is made by adding nano-particulates into a depletable foam during the foam manufacturing process.

In one embodiment, a method of making Dn-F involves the inclusion of nano-particulates during the manufacture of a polymer foam, such as a polystyrene foam, an epoxy foam, a thermoset foam, or other polymer foams. This method results in the encapsulation of these nano-particulates. Later, when embodiments of a Dn-F and a structural material are infused with resin, the infused resin interacts with the depletable foam (e.g., causes the foam to decompose and release gases), leaving the nano-particulates in the composite.

Figure 2:
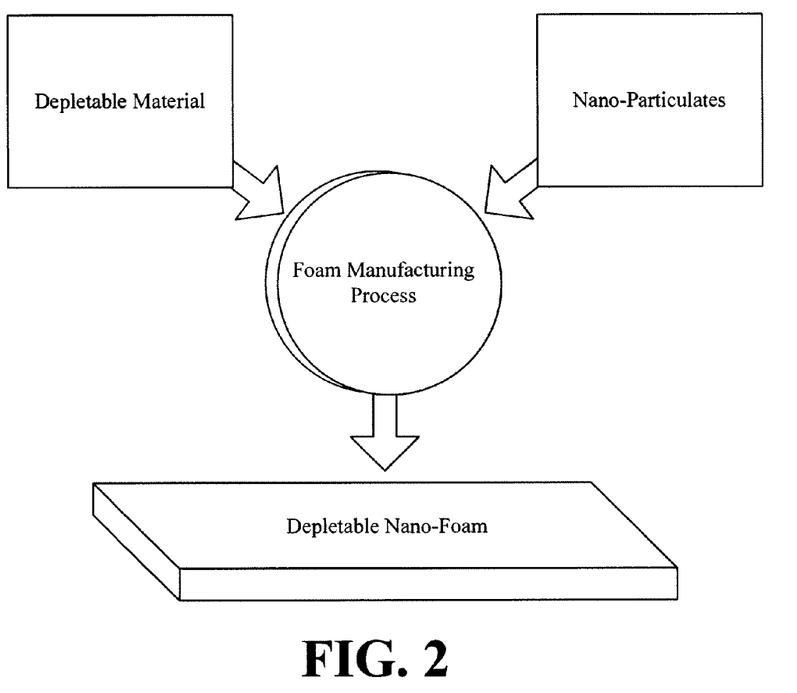
FIG. 2 is a flowchart illustrating one embodiment of a method for providing a nano-particulate-depletable material.

FIG. 2 depicts a method of selective placement of nano-particulates in a composite using Dn-F beginning with the manufacture of the Dn-F including nano-particulates. In similar fashion to the steps illustrated in FIGS. 1C-D, the Dn-F sheets including nano-particulates then may be selectively placed on or between structural materials. Next, the reinforcement-Dn-F layup may be placed in a vacuum infusion process or other liquid composite molding process. A resin is then infused into the Dn-F and the structural materials, thereby depleting the depletable foam and leaving the nano-particulates selectively placed on or with the structural materials. Upon resin cure, the multi-scale composite laminate may be de-molded by any procedure known in the art.

Figure 3A:
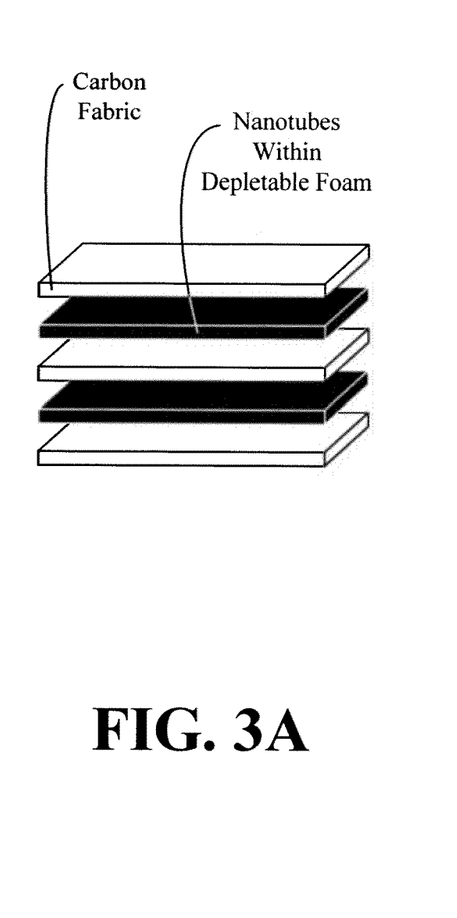
FIGS. 3A-C are exploded (FIG. 3A) and cross-sectional (FIGS. 3B, 3C) views of one embodiment of a composite material, showing the structure of the composite material before (FIGS. 3A, 3B) and after (FIG. 3C) depletion of a depletable foam.
Figure 3B:
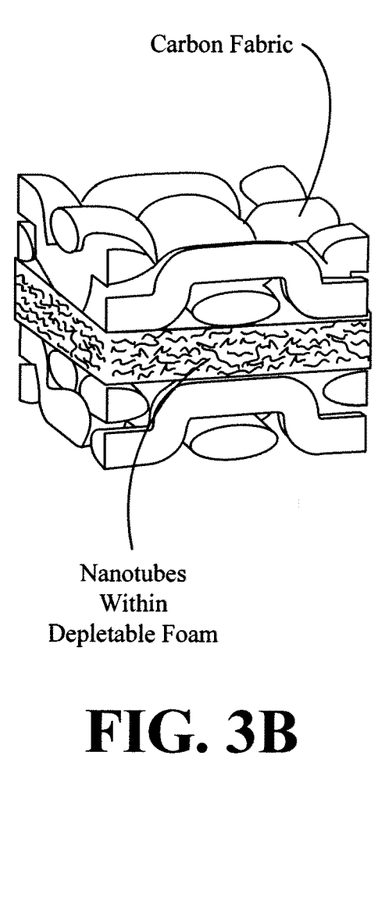
Figure 3C:
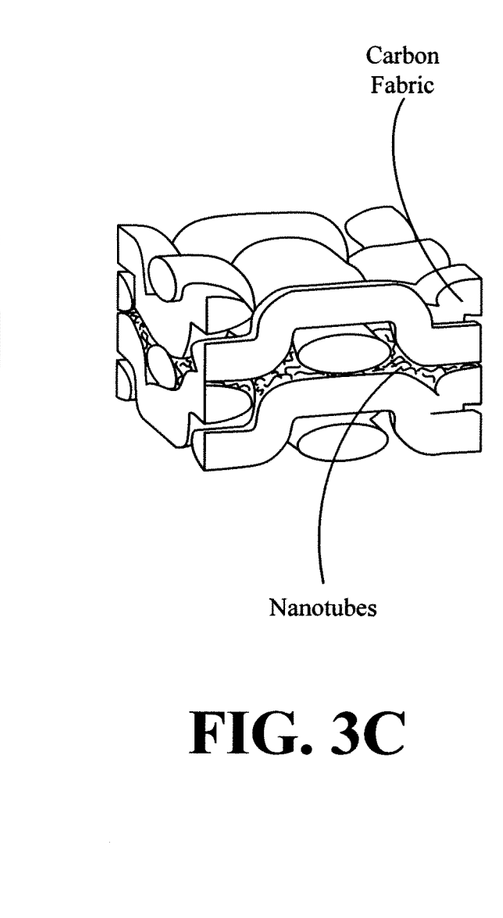

FIGS. 3A-C illustrate an embodiment for making a fabric-reinforced composite, wherein sheets of carbon nanotube reinforced foams are used to promote carbon nanotube dispersion within a carbon fabric composite. First, as shown in FIG. 3A, carbon fabric and Dn-F comprising carbon nanotubes and polystyrene foam are stacked. Next, as shown in the close-up illustrated in FIG. 3B, resin is infused into the carbon fabric-Dn-F layup. During resin infusion, the depletable foam dissolves and the carbon nanotubes are left to reinforce the resin infused carbon fabric composite, as shown in FIG. 3C.

As described herein, the step of depleting the depletable material may comprise infusing a resin into the structural material and the nano-particulate-depletable material or any other suitable technique for depleting the depletable material. In certain embodiments infusion of a suitable resin system (e.g., vinyl ester, thermoset resins, thermoplastic resins, or other resins capable of depleting the depletable material) to deplete the depletable material and leave the nano-particulates in the composite also results in infusion of the resin into a structural material. Thus, the resin may be cured and form a matrix in the resulting composite.

In another embodiment, the step of depleting the depletable material comprises heating the depletable material to melt or degrade the depletable material.

Without being bound by a particular theory, it is believed that the effects of the surface chemistry on the nanotube dispersion combined with a foaming process may alter the initial pore size and underlying nanotube orientation which serves as the initial conditions for a resin infusion process. Thus, placement of nano-particulates may be adjusted according to the desired application and properties of the resulting composite.

The Composite

In another aspect, a composite material is provided which includes a plurality of nano-particulates selectively placed on or within a structural material. These composite materials can be made by the methods described herein. In one embodiment, the nano-particulates are present in the composite in an amount up to about 10 weight % of the composite. In yet another embodiment, the nano-particulates are present in the composite sheet material in an amount ranging from about 5 weight % and about 10 weight % of the composite. Other amounts are envisioned, as the amount of nano-particulates present in the composite may be selected to achieve a desired composite characteristic for a given application.

In certain embodiments, different types of nano-particulates may be placed in different, selective areas of a composite to provide different composite functionalities.

Figure 4:
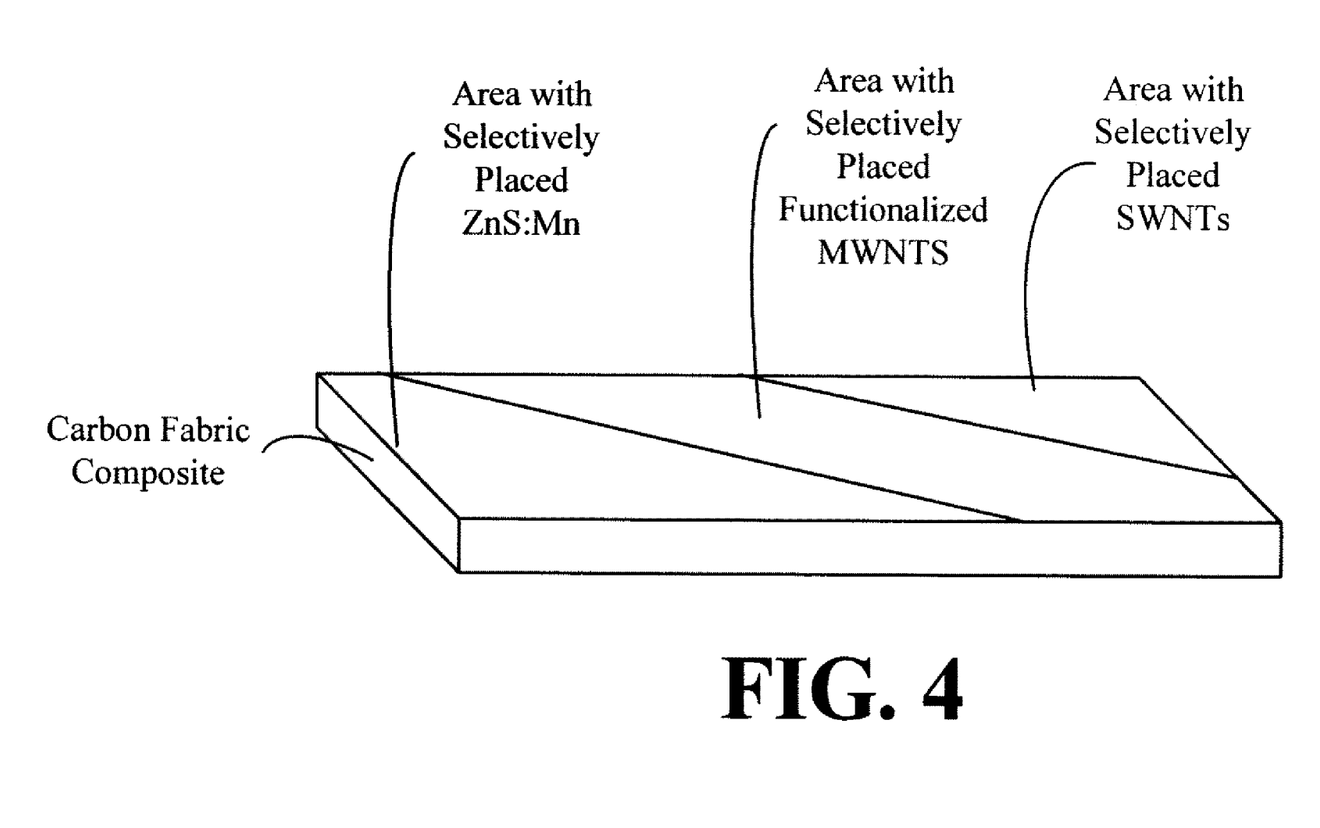
FIG. 4 illustrates one embodiment of a composite material with three areas including different nanoparticulates selectively placed therein.

FIG. 4 illustrates an embodiment of a multiscale composite with three areas including different nanoparticulates selectively placed therein. The first area includes nanoparticulates to improve the structural response in that portion of the laminate. This improved structural response is obtained by selectively placing single walled carbon nanotubes, which have high electrical conductivity, therein. The second area includes selectively placed functionalized multi-walled carbon nanotubes, which are cost effective and result in improved interfacial properties, thereby enhancing the structural response of the composite in that area. The third area includes ZnS:Mn, which has triboluminescent behavior in the detection of matrix cracking, and thus acts as damage sensors in that section of the composite.

Nano-Particulates

As used herein, the term "nano-particulates" refers to particles, granules, fibers, flakes, or any other form of nano- or micro-scale materials that may be placed or dispersed in a composite. Representative examples of suitable materials for use as nano-particulates include nanoscale fibers, nanoscale composite fibers, clay, talc, heavy-S metals (e.g., zinc sulfides, terbium, or europium), a combination thereof, or any other suitable material for improving or enhancing composites.

In certain embodiments, the composites may include nanoscale fibers. As used herein, the term "nanoscale fibers" refers to a thin, greatly elongated solid material, typically having a cross-section or diameter of less than about 500 nm. In certain embodiments, the nanoscale fibers are single-walled carbon nanotubes (SWNTs), multiple-walled carbon nanotubes (MWNTs), carbon nanofibers (CNFs), or mixtures thereof. Carbon nanotubes and carbon nanofibers have high surface areas (e.g., about 1,300 m$^2$/g), which results in high conductivity and high multiple internal reflection. In a preferred embodiment, the nanoscale fibers comprise or consist of carbon nanotubes, including both SWNTs and MWNT. SWNTs typically have small diameters (~1-5 nm) and large aspect ratios, while MWNTs typically have large diameters (~5-200 nm) and small aspect ratios. CNFs are filamentous fibers resembling whiskers of multiple graphite sheets.

As used herein, the terms "carbon nanotube" and the shorthand "nanotube" refer to carbon fullerene, a synthetic graphite, which typically has a molecular weight between about 840 and greater than about 10 million grams/mole. Carbon nanotubes are commercially available, for example, from Unidym Inc. (Houston, Tex. USA), or can be made using techniques known in the art.

The nanotubes optionally may be opened or chopped, for example, as described in U.S. Patent Application Publication No. 2006/0017191 A1.

The nanotube and nanofibers optionally may be chemically modified or coated with other materials to provide additional functions. For example, in some embodiments, the carbon nanotubes and CNFs may be coated with metallic materials to enhance their conductivity.

The Structural Material

The structural materials may include essentially any macroscale substrate or structure. For example, the structural material may include foams, honeycombs, glass fiber laminates, Kevlar fiber composites, polymeric materials, or combinations thereof. Non-limiting examples of suitable structural materials include polyurethanes, silicones, fluorosilicones, polycarbonates, ethylene vinyl acetates, acrylonitrile-butadiene-styrenes, polysulfones, acrylics, polyvinyl chlorides, polyphenylene ethers, polystyrenes, polyamides, nylons, polyolefins, poly(ether ether ketones), polyimides, polyetherimides, polybutylene terephthalates, polyethylene terephthalates, fluoropolymers, polyesters, acetals, liquid crystal polymers, polymethylacrylates, polyphenylene oxides, polystyrenes, epoxies, phenolics, chlorosulfonates, polybutadienes, buna-N, butyls, neoprenes, nitriles, polyisoprenes, natural rubbers, and copolymer rubbers such as styrene-isoprene-styrenes, styrene-butadiene-styrenes, ethylene-propylenes, ethylene-propylene-diene monomers (EPDM), nitrile-butadienes, and styrene-butadienes (SBR), and copolymers and blends thereof. Any of the forgoing materials may be used unfoamed or, if required by the application, blown or otherwise chemically or physically processed into an open cell, closed cell, or mixed open and closed cell foam.

In certain embodiments, the structural material comprises woven or non-woven fiber sheets. In a preferred embodiment, the woven or non-woven fibers are glass fibers, carbon fibers, aramid fibers, nanoscale fibers, or a combination thereof. In one embodiment, the structural materials comprise thin films of glass fibers, carbon fibers, aramid fibers, nanoscale fibers, or a combination thereof. Other fibers may also be suitable. Examples of suitable structural materials include fiberglass, carbon, and aramid fabric preforms, nanoscale fiber film (e.g., nanotube buckypaper, or nanotube sheet, produced by Nanocomp of Concord, N.H.), nanoscale fibers, nanoscale composite fibers, nanoscale fiber yarns, nanotube yarns, carbon felt, prepregs, polymer-based materials, nonwoven sheets of various fiber materials, and the like.

The composite may alternatively or additionally include a film or a matrix material, such as a plastic polymer resin coating and/or infiltrating a woven or non-woven glass, carbon, aramid, nanoscale, or other fibers. Thus, resins infused into nano-particulate-depletable materials to deplete the depletable material may also constitute a matrix of the resulting composite. In a preferred embodiment, the structural material includes carbon fibers, glass fibers, fiberglass, aramid fibers, or combinations thereof dispersed in a polymeric material.

The structural material may additionally include adhesives, metals, or any other suitable materials to make the composite material suitable for its intended use. For example, in certain embodiments, the composite include one or more adhesives (e.g., 3M Super 77 Multipurpose Adhesive). The adhesive may be used to hold the fabrics or material assemblies together, for example, to facilitate the stitching process described herein.

The composite may comprise one, two, three, four, or more sheets of structural materials stacked together.

Publications cited herein and the material for which they are cited are specifically incorporated by reference. Modifications and variations of the methods and composites described herein will be obvious to those skilled in the art from the foregoing detailed description. Such modifications and variations are intended to come within the scope of the appended claims.

We claim:

1. A method for making a composite comprising:
   providing a nano-particulate-depletable material comprising a plurality of nano-particulates on or within a depletable material, wherein the depletable material comprises a foam;
   positioning the nano-particulate-depletable material on or within a structural material; and
   depleting the depletable material such that the nano-particulates are selectively placed on or within the structural material.

2. The method of claim 1, wherein the nano-particulate-depletable material is in a porous solid form, which comprises a polymer with nanoscale fibers dispersed therein or thereon.

3. The method of claim 1, wherein the depletable material comprises a polystyrene foam.

4. The method of claim 3, wherein the nano-particulates are dispersed on or within the polystyrene foam during manufacture of the polystyrene foam.

5. The method of claim 1, wherein the depleting the depletable material comprises impregnating pores in the nano-particulate-depletable material with a fluid.

6. The method of claim 5, wherein the fluid comprises a resin.

7. The method of claim 6, wherein the resin is further impregnated into pores the structural material.

8. The method of claim 6, further comprising curing the resin that has been impregnated into the pores.

* * * * *